(12) United States Patent
Pearson et al.

(10) Patent No.: US 6,597,144 B2
(45) Date of Patent: Jul. 22, 2003

(54) METHOD AND APPARATUS FOR POWER LOSS DETECTION AND SAVING OF OPERATION SETTINGS IN AN APPLIANCE

(75) Inventors: Steven L. Pearson, Michigan City, IN (US); Mark L. Herman, St. Joseph, MI (US); Scott L. Hansen, St. Joseph, MI (US); Marvin L. Fox, Plainwell, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 148 days.

(21) Appl. No.: 09/885,643

(22) Filed: Jun. 20, 2001

(65) Prior Publication Data

US 2002/0008488 A1 Jan. 24, 2002

Related U.S. Application Data

(60) Provisional application No. 60/213,030, filed on Jun. 21, 2000.

(51) Int. Cl.[7] .............................................. G05B 11/28
(52) U.S. Cl. ...................... 318/599; 318/807; 318/808; 318/810; 318/812; 318/817
(58) Field of Search .............................. 318/807, 808, 318/803, 599, 810, 812, 817

(56) References Cited

U.S. PATENT DOCUMENTS

| | | | | |
|---|---|---|---|---|
| 3,593,103 A | * | 7/1971 | Chandler et al. ............ 363/174 |
| 3,786,219 A | * | 1/1974 | Kornrumpf et al. ......... 219/626 |
| 4,074,101 A | * | 2/1978 | Kiuchi et al. ................ 219/601 |
| 4,635,141 A | | 1/1987 | Coulter .......................... 360/44 |
| 4,890,176 A | | 12/1989 | Casey et al. ................. 360/105 |
| 4,937,692 A | | 6/1990 | Okutsu ........................ 360/105 |
| 4,949,206 A | | 8/1990 | Phillips et al. .............. 360/106 |
| 5,075,613 A | | 12/1991 | Fisher ......................... 318/809 |
| 5,081,552 A | | 1/1992 | Glaser et al. ............ 360/98.01 |
| 5,134,608 A | | 7/1992 | Strickler et al. ............ 369/215 |
| 5,162,955 A | | 11/1992 | Burdenko ................. 360/77.02 |
| 5,224,000 A | | 6/1993 | Casey et al. ................. 360/105 |
| 5,262,913 A | | 11/1993 | Stram et al. ................. 360/105 |
| 5,600,516 A | | 2/1997 | Phillips et al. .............. 360/105 |
| 5,715,119 A | | 2/1998 | Williams et al. ............ 360/105 |
| 5,717,544 A | | 2/1998 | Michael ...................... 360/104 |
| 5,745,325 A | | 4/1998 | Matsumoto ................. 360/105 |
| 5,826,325 A | | 10/1998 | Price et al. ................. 29/603.3 |
| 5,973,888 A | | 10/1999 | Chawanya et al. ......... 360/105 |
| 6,011,672 A | | 1/2000 | Matsumoto ................. 360/105 |
| 6,115,222 A | | 9/2000 | Andrews et al. ......... 360/265.1 |
| 6,125,017 A | | 9/2000 | Misso et al. ............. 360/265.1 |
| 6,420,858 B1 | * | 7/2002 | Kitagawa et al. ........... 323/282 |

* cited by examiner

Primary Examiner—Rita Leykin
(74) Attorney, Agent, or Firm—Thomas J. Roth; Robert O. Rice; Stephen Krefman

(57) ABSTRACT

A method and apparatus for monitoring voltage input to an appliance, such as a dryer, sensing when power input to the appliance is lost. In addition, a controller in the appliance pulses relay coils controlling motors and/or heating devices within the appliance to conserve energy on a backup capacitor that supplies the control circuit of the appliance in the event of power loss. Further, a voltage sense circuit outputting a square wave effects monitoring of the input voltage to the appliance by outputting the square wave signal whose cycle period is monitored to determine power outage. The controller stores current operation settings at the time of power outage in a memory device and ensures proper storage through the extra energy conserved from the capacitor by the pulsing of the relay coils.

21 Claims, 2 Drawing Sheets

METHOD AND APPARATUS FOR POWER LOSS DETECTION AND SAVING OF OPERATION SETTINGS IN AN APPLIANCE

BACKGROUND OF THE INVENTION

The present invention relates to a method and apparatus for detecting a power loss to an appliance and storage of current operation settings of the appliance when the power loss occurs.

Some appliances such as washing machines and dryers include a feature that allow the appliance to retain current operation settings in the event of a power outage. This is accomplished by monitoring the AC power input to the appliance, detecting when the AC power is lost and saving the current operation settings in a memory device such as a EEPROM so that when power is restored the washing machine cycle or dryer cycle will resume at the point in the cycle when power was lost. The period of time between loss of AC power and saving of the operation settings is critical since during this time a microprocessor or controller within the appliance is powered by a charged capacitor. Hence, the quicker that the current operation settings can be saved the more likely that the settings will actually be stored within the EEPROM.

In order to ensure that there is sufficient charge on the capacitor during power outage to store the current operation settings, an approach has been to increase the size of the capacitor so as to store more charge. However, larger capacitors are more expensive.

Additionally, appliances such as a washing machine or a dryer typically have a motor that turns a washing drum or a drying chamber, respectively. Other appliances, such as dishwashers, include motors which drive pumps. Microwave ovens often times include motors which drive rotating turntables. Most other domestic appliances also include motors and/or heating elements. During the power outage, the motor within the appliance continues to rotate for a short time, especially given a large washing or drying load, which increases the mass and, hence, the momentum of the washing drum or the drying chamber. This continued rotation of the motor after power outage causes transient voltages to be generated from the motor on the incoming line, that, in turn, cause noise to be present in the supply to a control microprocessor that is supplied with power by the incoming line through a power supply circuit. This noise creates a problem in that the microprocessor senses this noise and, thus, does not quickly recognize that power on the incoming AC line has been lost. Furthermore, by the time that the microprocessor recognizes power loss, the capacitor used to store the current operation settings of the appliance has been partially discharged due to continued operation of other loads such as a relay coil driving a contact to the motor or a heater element. The partial discharge of the capacitor during the time that the microprocessor does not recognize power loss leads to the inability of the microprocessor to save current operation settings since enough charge on the capacitor does not remain to effect this storage.

SUMMARY OF THE INVENTION

There is therefore a need for an apparatus and method for more quickly recognizing loss of input power to a device, such as an appliance, so that operation settings will not be lost in the event of transient noise generated from an electromechanical device within the device. Additionally, the need exists for faster recognition of AC power loss in order to reduce the discharge time of a capacitor and, hence, allowing the capacitor to have a smaller value.

These and other needs are met by the present invention including a method for monitoring power input to a device where at least a voltage signal on an incoming line to the device is monitored. Variations of a frequency of at least the monitored voltage signal from a prescribed frequency are sensed and a power loss signal is issued when a variation of the frequency from the prescribed frequency exceeds a first predetermined amount. The power loss signal indicates a detected loss of power input on the incoming line. By sensing variations of the frequency of the monitored voltage signal, the present method is able to take into account transient noise generated by a motor after power loss more quickly than the known art.

According to another aspect of the present invention, a method for monitoring power input to an appliance and storing current operation settings of the appliance when the power input is lost includes monitoring at least a voltage signal on an incoming line to the device and sensing variations of a frequency of at least the monitored voltage signal from a prescribed frequency. When a variation of the frequency from the prescribed frequency exceeds a first predetermined amount a power loss signal is issued. The power loss signal indicates that a loss of power input on the incoming line has been detected. Relay coils that control power input to at least one of an electromechanical device and heating device within the appliance are pulsed at a predetermined duty cycle in response to the power loss signal in order to increase a discharge time of an electric charge on a capacitor connected to the input line and also connected to the relay coil. Finally, current operation settings of the appliance are simultaneously stored in a memory using the charge of the capacitor. The pulsing of the relay coils allows the relay coils to still maintain closed contacts in order to avoid an unnecessary opening of the contacts in a situation such as a brown out, thereby mitigating deleterious effects to the relay coils in these situations. Additionally, since the relay coils are driven by capacitor power, the pulsing at a predetermined duty cycle conserves charge on the capacitor that is later or simultaneously used for storing the current operation settings. Hence, enough capacitor charge will be present to ensure proper storing of the current operation settings. A further advantage is that a smaller capacitor can be utilized since the pulsing of the relay coils affords conservation of capacitor charge, and, thereby, a minimization of capacitor cost.

According to yet another aspect of the present invention an apparatus is provided for monitoring power input to an appliance and saving current operation settings of the appliance in the event of a power input loss. The apparatus includes a power input line for supplying a power input to the appliance. In addition, a power supply circuit for converting a voltage of the power input into a plurality of supply voltages is included. A capacitor within the power supply circuit is connected between the first supply voltage and a ground. A voltage sensing circuit is connected to the second supply voltage and outputs a sensing signal having a frequency that corresponds to a power input frequency of the power input line. One or more relay coils that control power input from the power input line to at least one of an electromechanical device and a heating device within the appliance are included. Current operation settings of the appliance are stored by a provided memory device. A controller is included that is configured to detect the frequency of the sensing signal, control the relay coils and store current operation settings of the appliance in the memory device. The controller pulses the relay coils using an electric charge from the capacitor at a prescribed duty cycle and also stores current operation settings of the appliance in the memory device using the same electric charge from the same capacitor when the controller detects a change in the frequency of the sensing signal after a predetermined number of cycles of the sensing signal.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings wherein.

DETAILED DESCRIPTION OF THE PREFERRED EMBODIMENTS

The present invention is applicable to various appliances or devices that have the capability of storing current operation or cycle settings in the event of a loss of power input and, in particular, to appliances and devices also having an electromechanical device such as a motor that may potentially present transient voltages during the time period immediately following loss of a power input. The present invention, for purposes of explanation, will be described in the context of an automatic clothes dryer. However, the present invention is, as mentioned above, applicable to various appliances and devices.

Figure 1:
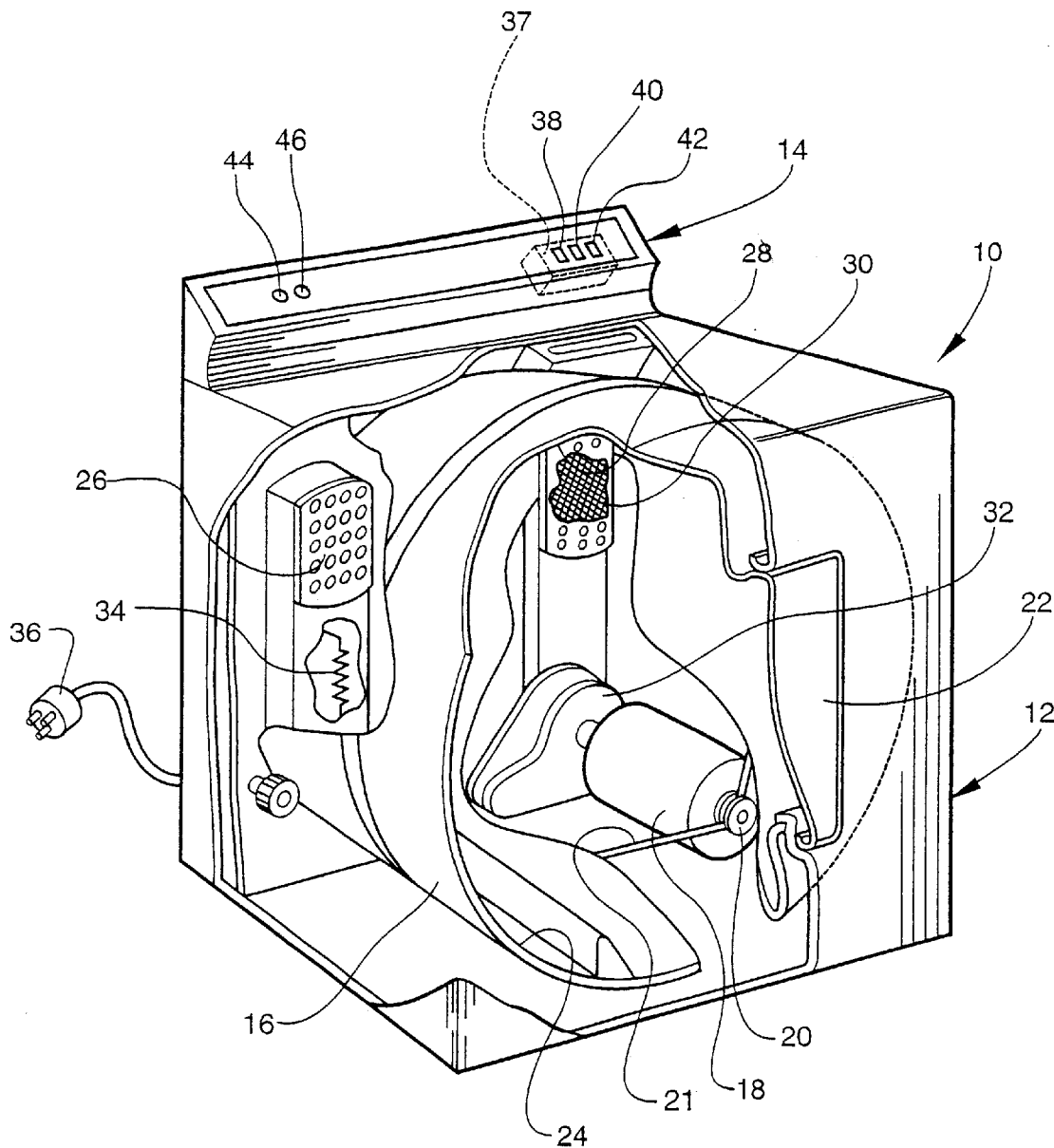
FIG. 1 is a partly cutaway perspective view of a clothes dryer employing the power input monitoring and current operation setting memory storage of the present invention.
Figure 2:
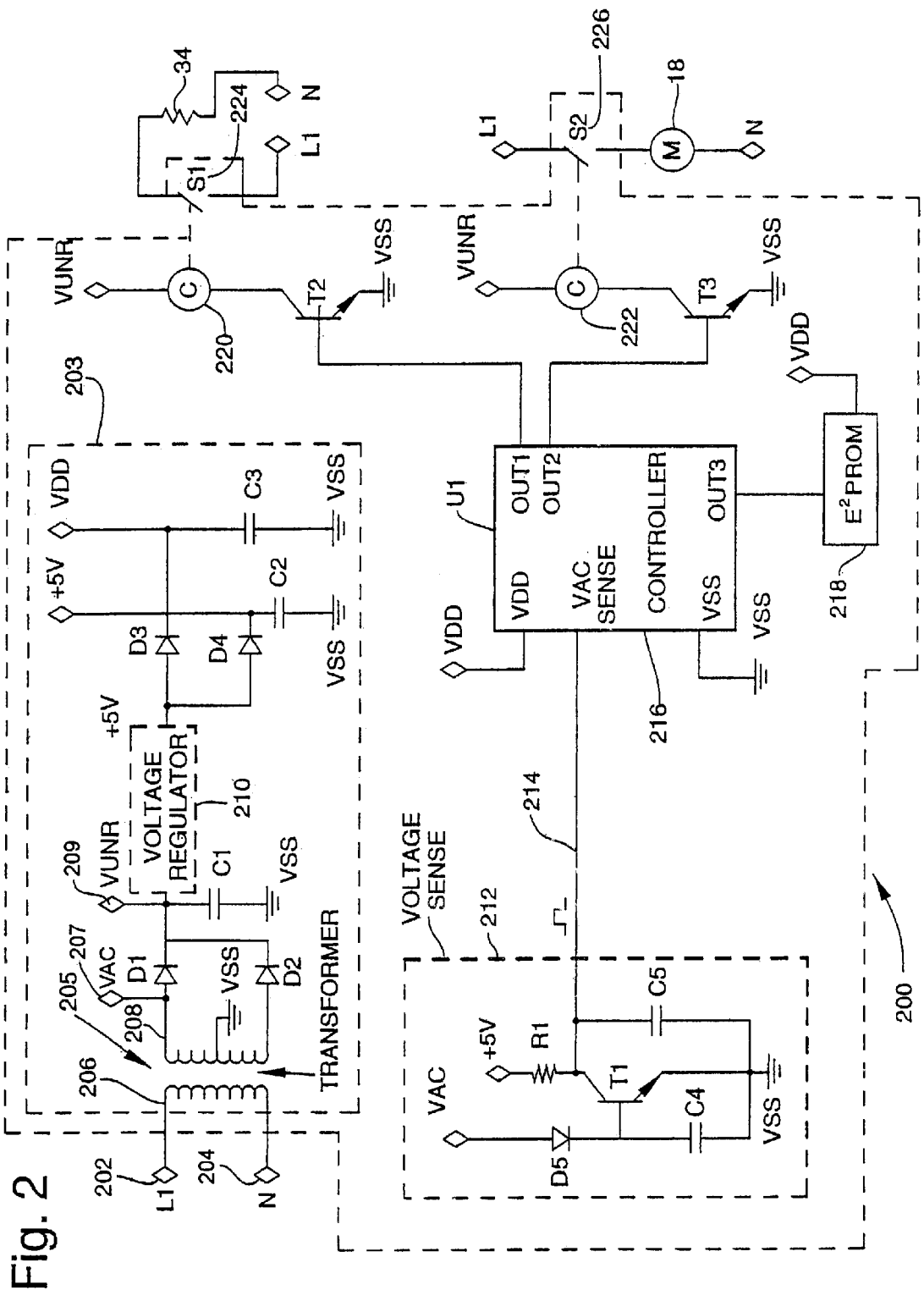
FIG. 2 is a circuit diagram of the monitoring and control circuit according to an embodiment of the present invention.

In FIG. 1 of the drawings, an automatic clothes dryer 10 is illustrated that is controlled, in part, by the control apparatus 200 shown in FIG. 2. Specifically in FIG. 1, the mechanical components of the clothes dryer are well known in the art and are, thus, not shown in great detail. The clothes dryer 10 has a cabinet 12 including a control console 14. Within the cabinet 12 is rotatably mounted a drum 16 that is rotatably driven about a horizontal axis by a motor 18 through a drive system 20, typically including a belt 21. A front door 22 formed in the front of the cabinet 12 provides selective access to the clothes treatment chamber 24 defined by the interior of the drum 16.

The drum 16 is provided with an inlet aperture 26 and an outlet exhaust aperture 28 having a removable lint screen 30. A supply of air is circulated by a fan 32 driven by the motor 18. A heating element 34 is selectively energized by a relay coil 220, shown in FIG. 2, that is controlled by a controller 216 located within the control console 14, for example. As is well known in the art, supply of the temperature controlled air is circulated by the fan 32 past the heating element 34 through the inlet aperture 26 into the clothes treatment chamber 24 within the drum 16 and subsequently output through the outlet exhaust aperture 28 including the lint screen 30.

The control console 14 includes a user interface 37 having, for example, a start button 38, a dryness selector 40 and a temperature selector 42 to permit a user to start a drying cycle, as well as select other operation settings and parameters of the drying cycle. Further, the user interface 37 may also include means to allow a user to set time settings (not shown) such as a period of time in which the dryer is allowed to operate.

It is noted that the control circuitry of FIG. 2 may be located within the control console 14. However, other locations within the appliance 10 for the control circuitry could be utilized. Typically, input power for the dryer 10 is supplied from a 208 V.A.C. or 240 V.A.C. power source by means of an input power supply 36, such as via a three-wire pigtail. In the present embodiment shown in FIG. 2, a single phase line L1 is input to the power supply and control circuitry 200. This voltage typically is 120 V.A.C.

As shown in FIG. 2, an input voltage to the control circuit 200 is derived from line L1 and a neutral, shown delivered to terminals 202 and 204, respectively. The input power is delivered to a power supply circuit 203 within the control circuit 200 to a primary coil 206 of a transformer 205. The line voltage L1 is transformed down to approximately 5 volts in a preferred embodiment across the secondary coil 208, although other voltages could be used. This voltage is rectified via diodes D1 and D2 to supply a full wave rectified alternating voltage V.A.C. In addition, a capacitor C1 is connected from the output of the full wave rectifier (i.e., diodes D1 and D2) to a potential VSS connected to ground. The voltage VUNR at node 209 is also delivered to voltage regulator 210, which outputs a steady state 5 volt signal. This 5 volts is split into a +5 volts source and a VDD source.

The control circuit 200 also includes a voltage sense circuit 212 comprised of a transistor T1 diode D5 and filtering capacitors C4 and C5. The voltage V.A.C. from node 207 is input to the base of transistor T1 via diode D5. Thus, this AC signal, which is typically 60 Hertz, turns on transistor T1 during every other half cycle since diode D5 acts as a half wave rectifier. When transistor T1 is in an "on" state allowing conduction of the 5 volt source through resistance R1 to ground potential VSS, the output 214 of the voltage sense circuit 212 is at a low state. During the next half cycle of the AC voltage V.A.C., the transistor T1 is in an "off state preventing conduction through the transistor. At this point, the resistor R1 pulls up the voltage on line 214 to 5 volts until the next half cycle of voltage source V AC. At that time, T1 again becomes conductive and the voltage on line 214 is again brought to ground or zero potential. Accordingly, the output of the voltage sense circuit 212 is a square wave signal which is delivered to the V AC sense input of controller 216. Since, during normal operation, the incoming line is operating at 60 Hertz frequency, the square wave signal out of voltage sense circuit 212 also has a frequency of 60 Hertz with a cycle of 16.66 milliseconds. Thus, a typical half cycle of the square wave is 8.33 milliseconds.

With the voltage sense circuit 212, any change in the cycle length or, more particularly, the time between zero crossings of the square wave signal output from the voltage sense circuit, varying from a time period of 8.33 milliseconds can be sensed and such variation can be used to indicate that the incoming line voltage has either been lost or is undergoing a brown-out situation. Since capacitor C1 maintains a charge even after line voltage L1 is lost, the 5 volt signal is supplied to the voltage sense circuit 212 for a short period. As described previously, the motor 18 may continue to rotate for a short time after the line voltage L1 is lost and, therefore, acts as a generator presenting transient voltages on the line L1. These transient noise signals are, in turn, transformed in the power supply circuit 203 and are present at the node 207 for voltage V.A.C. The motor 18 immediately begins to lose momentum as power on line L1 is lost and causes the voltage V.A.C. to vary from the normal 60 Hertz or, in other words, the normal 8.33 millisecond half cycle period. Recognizing that this occurs, detection of variations in the zero crossing of the square wave signal output from the voltage sense circuit 212 may be used to quickly recognize either a power loss or a brown out on line L1.

The controller 216 contains internal software that is programmed to sense the period of the incoming square wave signal on line 214 and initiate an internal power loss signal when the half cycle period varies from 8.33 milliseconds. This controller is powered by voltage source VDD in normal operation. In the situation of a power loss or brown out, the capacitor C1 provides energy to the controller for a short time period. The controller 216 also controls transistors T2 and T3 that drive relay coils 220 and 222, respectively. Normally, the outputs OUT1 and OUT2 are a steady state voltage that holds transistors T2 and T3 in an "on" state. Relay coil 220 is supplied with the voltage VUNR and closes switch 224 to cause the heating element 34 to energize. Similarly, relay coil 222 is used to control the operation of motor 18 which is switched to line L1 directly via switch 226 driven by relay coil 222.

The controller 216 also has a third output OUT3 that is used to save current operation settings of the appliance in an EEPROM 218, which is also supplied by voltage source VDD. The EEPROM is used to store the current operation settings in the event of a power outage on line L1.

In the event of a power loss or brown out on line L1, the voltage sense circuit 212 begins to output a square wave signal having a time between voltage zero crosses of greater than 8.33 milliseconds. Furthermore, if the motor 18 is operating at the time of power loss or brown out, transient noise voltages will be generated on line L1. As the motor slows, the time between zero crossings of the voltage of the output of voltage sense 212 will begin to increase to times of 9 milliseconds, 10 milliseconds, etc. In the present invention, the controller is programmed to sense any variation from a voltage zero-cross time of 8.33 milliseconds. After the first half cycle that varies from this time, the controller initiates pulsing of the output signals OUT1 and OUT2 at a prescribed duty cycle that is less than 100% or, in other words, less than a steady state voltage. This pulsing is performed in order to protect the relay coils 220 and 222 from excessive wear and damage that can be caused by simply allowing them to turn off. In the event of a complete power loss or a brown out where the line voltage L1 drops below 120 volts, the charge on capacitor C1 is used to supply the voltage VDD to the controller and also the voltage VUNR to drive the relay coils C1 and C2. Additionally, the controller needs only pulse transistor T2 or T3 when either the heating element 34 or the motor 18 was required to be run at that particular point in the drying cycle. Pulsing of the relay coils is preferably accomplished with a 50% duty cycle, which enables the coils to still operate, yet consumes less of the capacitor energy of the capacitor C1. Furthermore, in the event of a brown out, pulsing the relay coils maintains the connection via switches 224 and 226 to the heater 34 or motor 18, respectively during the dip in voltage occurring during the brown out such that when the voltage again rises to normal operating voltage, no disruption in the settings of these switches occurs.

In the event of a complete power loss, pulsing of the transistors T2 and T3 conserves the charge energy in capacitor C1 for a longer period of time. In a preferred embodiment, the controller 216 waits for four detected cycles of the output of voltage sense circuit 212 before storing the current operation settings to the EEPROM 218, the storage operation also using the charge energy of capacitor C1 to perform this operation. Preferably, the controller is programmed to wait for four cycles of the square wave output (i.e., approximately 64 msec) from the voltage sense circuit 212 before storing the current operation settings in the EEPROM 218. This time delay allows the controller 216 to accurately determine whether a loss of power on line L1 has occurred or merely a brown out before saving the current settings. Hence, unnecessary storage of current operation settings is avoided. Greater or lesser numbers of detected longer periods could be used, depending on the appliance, typical motor loads and other power demands. However, the number should preferably not be so low that unnecessary storage operations are frequently performed nor should the number be so high that the capacitor charge is frequently discharged prior to the saving of the operation settings.

The pulsing of the relay coils is advantageous in conserving energy from capacitor C1 which is used to supply power to the relay coils 220 and 222, the controller 216, the voltage sense circuit 212 and the EEPROM 218. Preferably, the capacitor C1 is of sufficient size to afford enough charge to both pulse the relay coils and to effect storage of current operation settings in the EEPROM 218. In order to provide sufficient charge, the capacitor C1 is set at a value of approximately 2200 $\mu$F to provide about 300 milliseconds of available charge, which is sufficient to effect operation of the above mentioned devices. It is noted, however, the value of the capacitor C1 is set in conjunction with the effective resistance of the circuit in which the capacitor C1 is contained in order to achieve an RC time constant to allow sufficient time to store the operation settings in the BEPROM 218. The capacitor C1 value however, is nonetheless much smaller than would be required absent the pulsing operation of the coils and the quick voltage sensing afforded by voltage sense circuit 212. Thus, the capacitor C1 is a "smaller value" than would otherwise be required, which also reduces the cost of the control circuit 200. The above provides a detailed description of the best mode contemplated for carrying out the present invention at the time of filing the present application by the inventors thereof. It will be appreciated, however, by those skilled in the art that many modifications and variations, which are included within the intended scope of the claims, may be made without departing from the spirit of the invention.

We claim:

1. A method for monitoring power input to a device comprising:

monitoring a frequency of a signal on an incoming line to the device by monitoring an output signal of a voltage sensing circuit within the device, which receives an input from the incoming line, the output signal having a signal characteristic corresponding to a square wave signal and having a corresponding prescribed cycle period;

sensing variations in the frequency of the monitored signal from a prescribed frequency by detecting when a cycle period of the output signal varies from the prescribed cycle period by a predetermined amount; and issuing a power loss signal when the cycle period of the output signal varies from the prescribed period by another predetermined amount.

2. A method according to claim 1, wherein the power loss signal indicates a detected loss of power input on the incoming line.

3. A method for monitoring power input to an appliance and storing current operation settings of the appliance when the power input is lost, the method comprising the steps of:

monitoring at least a voltage signal on an incoming line to the device;

sensing variations of a frequency of at least the monitored voltage signal from a prescribed frequency;

issuing a power loss signal when a variation of the frequency from the prescribed frequency exceeds a first predetermined amount; and pulsing relay coils controlling power input to at least one of an electro-mechanical device and a heating device within the appliance at a predetermined duty cycle in response to the power loss signal in order to increase a discharge time of an electric charge on a capacitor connected to the input line and also connected to the relay coil; and storing current operation settings of the appliance in a memory using the charge of the capacitor after a predetermined number of cycles of the monitored voltage signal.

4. The method according to claim 3, wherein the voltage signal is an alternating voltage.

5. The method according to claim 3, further comprising the steps of:

monitoring an output signal of a voltage sensing circuit within the device, which receives an input from the incoming line, the output signal having a signal characteristic with a corresponding prescribed period;

detecting when a cycle period of the output signal varies from the prescribed cycle period by a second predetermined amount, which correlates to the prescribed frequency exceeding the first predetermined amount; and issuing the power loss signal when the cycle period of the output signal varies from the prescribed period by the second predetermined amount.

6. The method according to claim 5, wherein the prescribed frequency is 60 Hertz and the prescribed cycle period is 16.66 milliseconds.

7. The method according to claim 5, wherein the signal characteristic is a square wave signal.

8. The method according to claim 3, wherein the appliance is one of a clothes dryer, a clothes washing machine and a dish washing machine.

9. The method according to claim 3, wherein the electro-mechanical device is a motor.

10. An apparatus for monitoring power input to an appliance and saving current operation settings of the appliance in the event of a power input loss, comprising:

a power input line that supplies a power input to the appliance;

a power supply circuit that converts a voltage of the power input into at least first and second supply voltages;

a capacitor within the power supply circuit connected between the first supply voltage and a ground;

a voltage sensing circuit connected to the second supply voltage and outputting a sensing signal having a frequency that corresponds to a power input frequency of the power input line;

one or more relay coils that control power input from the power input line to at least one of an electro-mechanical device and heating device within the appliance;

a memory device configured to store current operation settings of the appliance; and a controller that detects the frequency of the sensing signal, controls the relay coils and stores current operation settings of the appliance in the memory device, the controller pulsing the relay coils using an electric charge from the capacitor at a prescribed duty cycle and stores current operation settings of the appliance in the memory device after a predetermined number of cycles of the sensing signal by using the electric charge from the capacitor when the controller detects a change in the frequency of the sensing signal.

11. The apparatus of claim 10, wherein the prescribed duty cycle is less than 100%.

12. The apparatus of claim 11, wherein the prescribed duty cycle is 50%.

13. The apparatus of claim 10, wherein the memory device is an EEPROM.

14. The apparatus of claim 10, wherein the electro-mechanical device is a motor.

15. The apparatus of claim 10, wherein the sensing signal is a square wave signal having a normal cycle period of 16.66 milliseconds.

16. The apparatus of claim 10, wherein the controller is configured to drive the relay coils with a steady state voltage during normal operation; and the change in frequency of the sensing signal signifies a loss of power on the power input line and the controller is configured to respond to the change in frequency by switching from the steady state voltage to pulsing the relay coils at the prescribed duty cycle.

17. The apparatus of claim 10, wherein the capacitor is approximately 2200 $\mu$F.

18. The apparatus of claim 10, wherein the frequency change detected by the controller is an increase in a cycle period of the sensing signal.

19. An apparatus for monitoring power input from a power input line to an appliance and saving current operation settings of the appliance in the event of a power input loss, the apparatus comprising:

one or more relay coils configured to control the power input to at least one of an electro-mechanical device and heating device within the appliance at a prescribed duty cycle in response to a power loss signal sensed by a voltage sensing circuit in order to increase a discharge time of an electric charge on a capacitor connected to the power input line and also connected to the one or more relay coils; and a memory device configured to store current operation settings of the appliance using the electric charge of the capacitor after a predetermined number of cycles of the sensing signal.

20. The apparatus of claim 19, further comprising a power supply circuit configured to convert a voltage of the power input into at least first and second supply voltages;

a voltage sensing supply circuit connected to the second supply voltage and outputting a sensing signal having a frequency that corresponds to a power input frequency of the power input line; and a controller configured to detect the frequency of the sensing signal, control the relay coils and store current operation settings of the appliance in the memory device.

21. The apparatus of claim 19, wherein a controller pulses the relay coils using an electric charge from the capacitor at the prescribed duty cycle and the controller stores current operation settings of the appliance in the memory device after the predetermined number of cycles of the sensing signal by using the electric charge from the capacitor when the controller detects a change in the frequency of the sensing signal.

* * * * *